US00RE41191E

(19) United States
(12) Reissued Patent
Choi

(10) Patent Number: US RE41,191 E
(45) Date of Reissued Patent: Apr. 6, 2010

(54) COLOR CURVE CONTROL CIRCUIT AND METHOD

(75) Inventor: Chun-Geun Choi, Suwon (KR)

(73) Assignee: Samsung Electronics Co., Ltd., Suwon-si, Gyeonggi-do (KR)

(21) Appl. No.: 10/067,758

(22) Filed: Feb. 8, 2002

Related U.S. Patent Documents

Reissue of:
(64) Patent No.: 6,025,823
Issued: Feb. 15, 2000
Appl. No.: 08/873,289
Filed: Jun. 11, 1997

(30) Foreign Application Priority Data

Jun. 11, 1996 (KR) ..... 96-20847

(51) Int. Cl.
*G09G 3/36* (2006.01)

(52) U.S. Cl. ..... 345/101; 345/83; 345/88; 345/589; 345/591; 345/593; 345/597; 345/600; 345/E9.051

(58) Field of Classification Search ..... 345/22, 345/83–107, 589–606; 348/655–657
See application file for complete search history.

(56) References Cited

U.S. PATENT DOCUMENTS 3,927,346 A * 12/1975 Spannhake
4,694,330 A * 9/1987 Tanaka et al. ..... 348/652
4,769,703 A 9/1988 Osborne et al.
5,400,086 A * 3/1995 Sano et al. ..... 348/678
5,619,229 A * 4/1997 Kumaki
5,748,171 A * 5/1998 Ishizaki et al. ..... 345/101
5,852,430 A * 12/1998 Endo ..... 345/101

FOREIGN PATENT DOCUMENTS

JP 60-47584 3/1985
JP 4-243392 8/1992
KR 1998-7777 3/1998

* cited by examiner

*Primary Examiner*—Vijay Shankar
(74) *Attorney, Agent, or Firm*—Robert E. Bushnell, Esq.

(57) ABSTRACT

A color curve control circuit includes: a data input unit, for entering values for changing colors on the screen of a monitor; a microcomputer, for processing color signals corresponding to color temperature using stored color temperature data and a color curve control program, in order to change the colors on the screen according to signals generated by the data input unit, and for generating color gain signals and color cutoff signals; and a digital to analog converter for converting the digital color gain and cutoff signals from the microcomputer into analog signals.

78 Claims, 3 Drawing Sheets

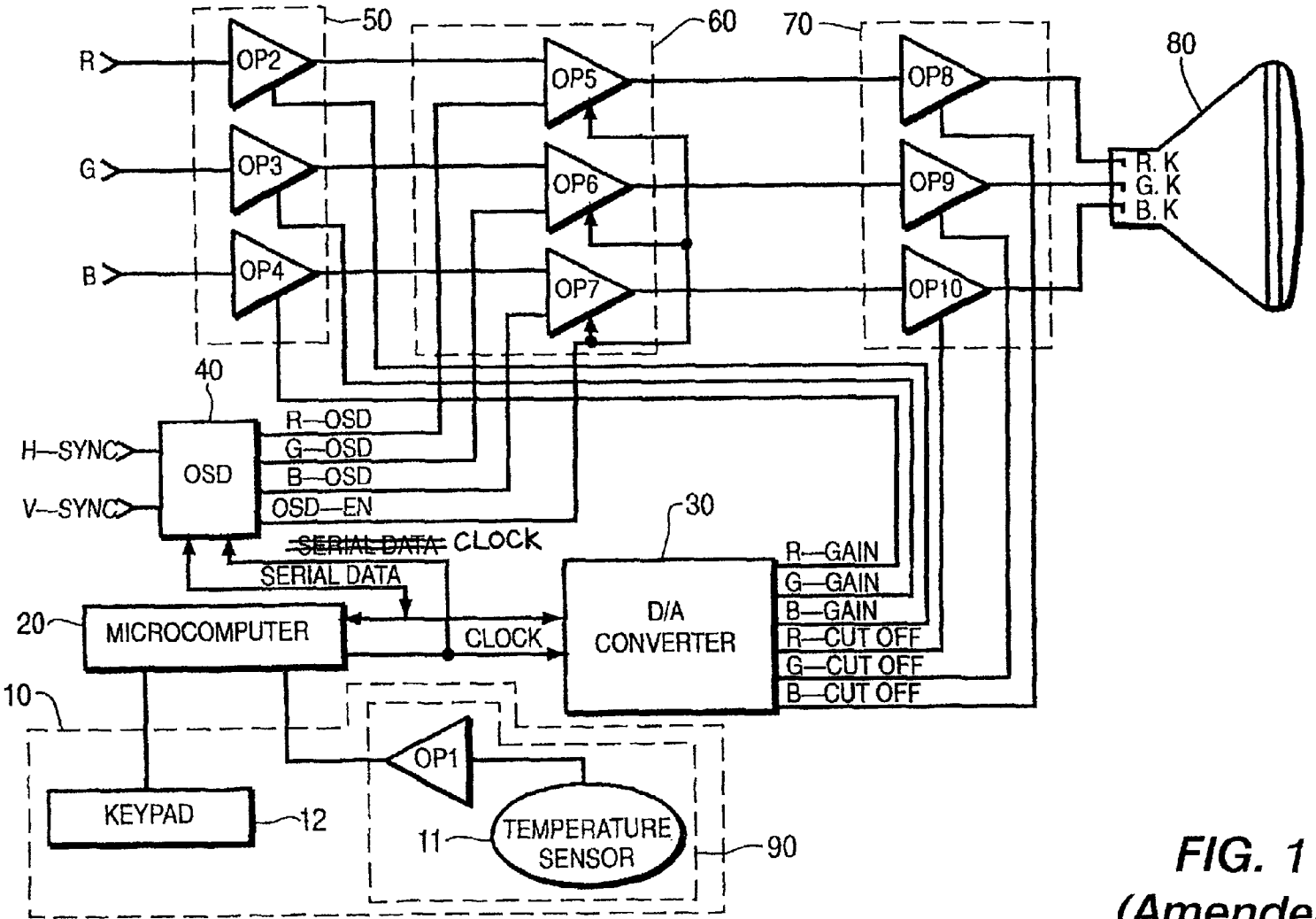
FIG. 1
(Amended)

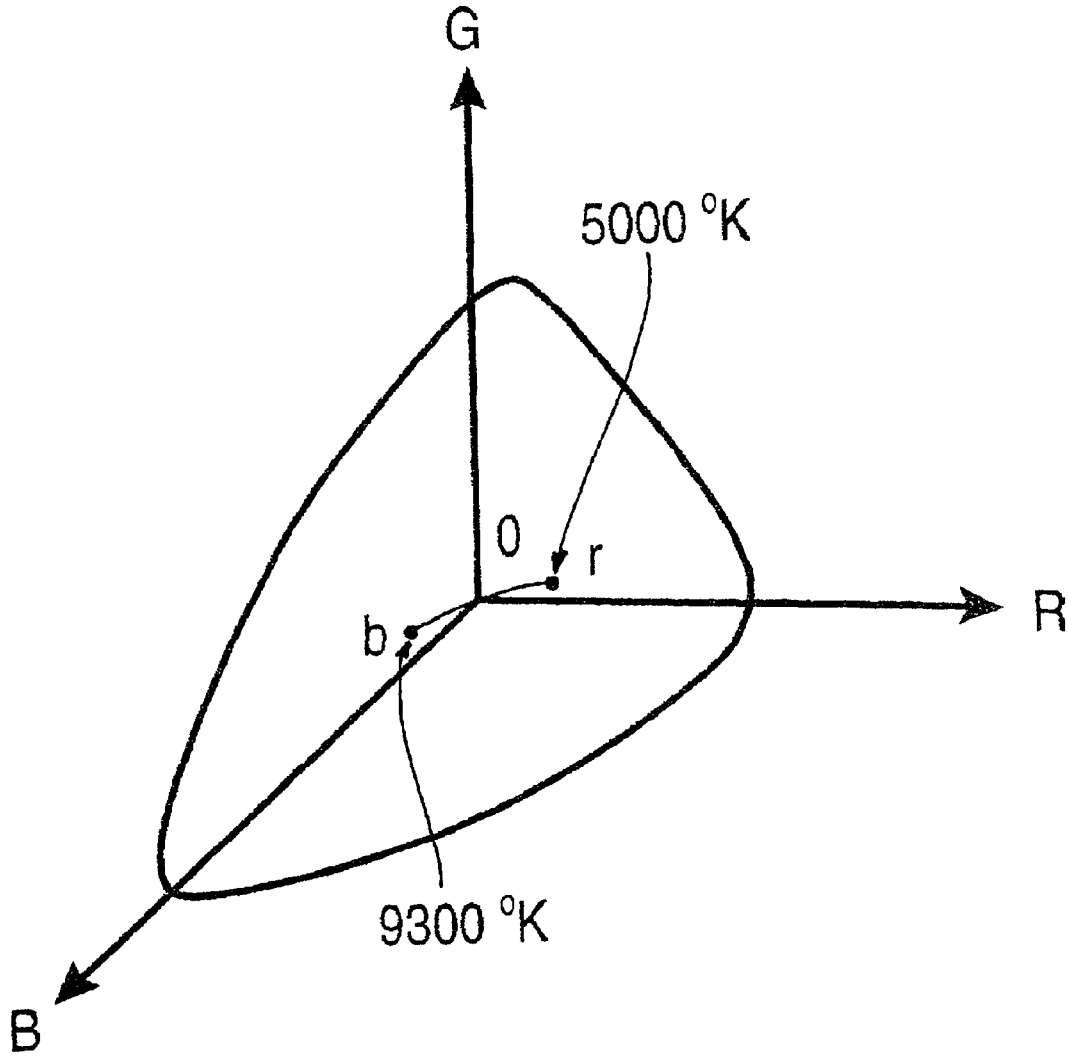
FIG. 2 (Amended)

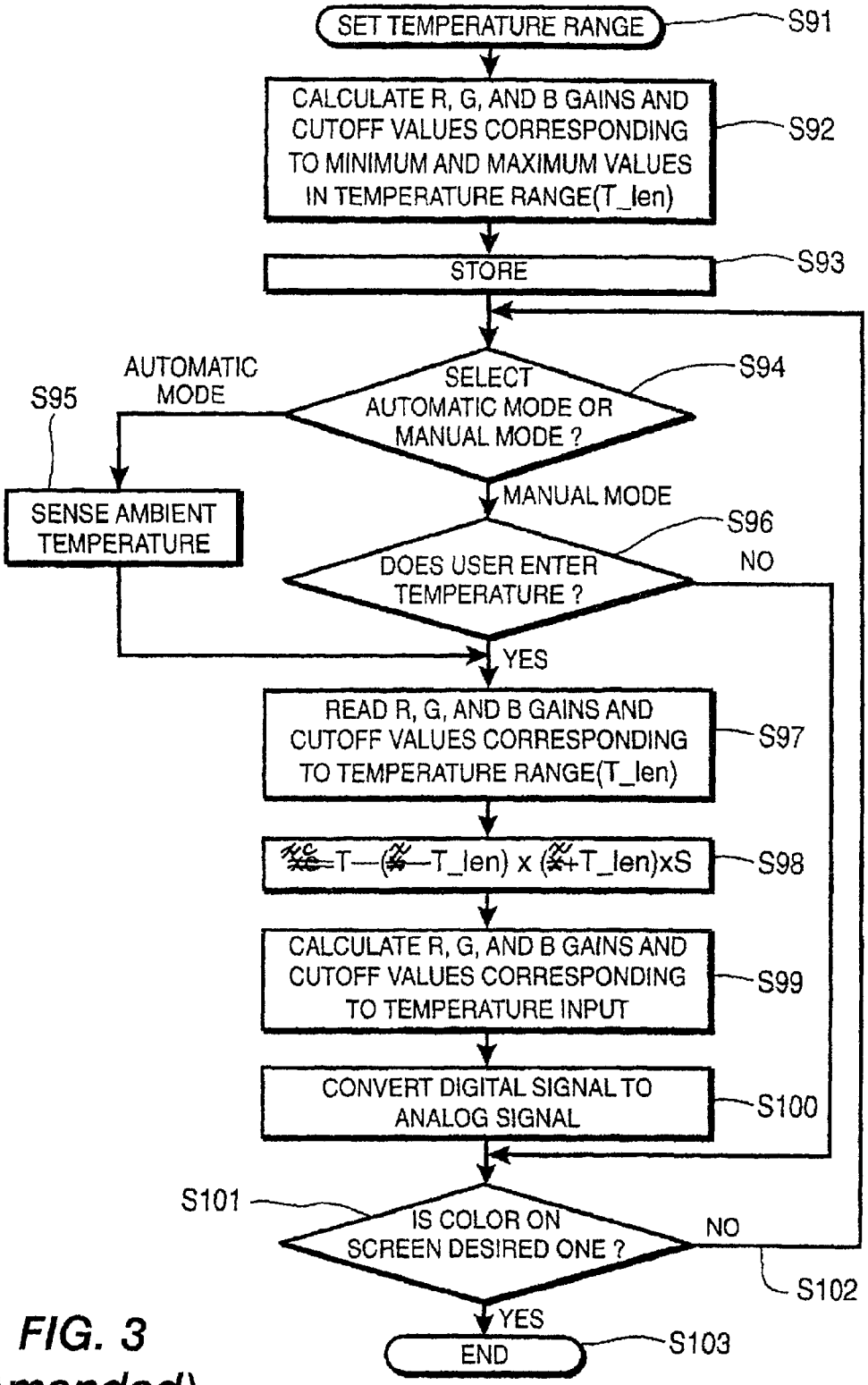
FIG. 3
(Amended)

COLOR CURVE CONTROL CIRCUIT AND METHOD

Matter enclosed in heavy brackets [ ] appears in the original patent but forms no part of this reissue specification; matter printed in italics indicates the additions made by reissue.

CLAIM OF PRIORITY

This application makes reference to, incorporates the same herein, and claims all benefits accruing under 35 U.S.C. §119 from an application entitled Color Curve Control Circuit And Method earlier filed in the Korean Industrial Property Office on Jun. 11, 1996, and there duly assigned Serial No. 20847/1996 by that Office.

BACKGROUND OF THE INVENTION

1. Field of the Invention

The present invention relates to a color curve control circuit and method. Specifically, this invention easily adjusts the colors as desired by the user, on the screen of a monitor using color gain and cutoff signals corresponding to the color temperature.

2. Discussion of Related Art

Red does not indicate just one color. There are many variant colors from a red similar to orange to purplish red. There are also variant colors such as yellowish white and bluish white in white resulting from mixture red (R), green (G), and blue (B). Therefore, it is necessary to define the desirable three primary colors of light, R, G, and B, and standard white. The standard colors are employed by Commission International de L'Eclairage (CIE), and represented with R, G, B, and white points of light.

CIE defines the three primary colors according to wavelengths, thus light of 700 nm (*nanometers*) is defined as R, the light of 546 nm is defined as G, and the light of 435 nm is defined as B. CIE uses color matching where mix ratios of the three primary colors are calculated using a color matching measurement device to obtain various colors, thus colors are created by mixing the three colors according to calculated ratios.

Since human eyes sense colors differently and individually, and since they are most sensitive to the light near 550 nm, there are large perceived differences between R, G, B when the intensities of the three primary colors are represented by the absolute lumen or watt values. In color matching, a standard white is defined as the amount of R, G, and B which is necessary to match the standard white, and the amount of white, that is R+G+B, is set to 1. The amounts of R, G, and B is represented with a ratio to the white. For example, a color of 600 nm is made by mixing 0.34 of R, which is necessary to make the standard white, with 0.07 of G, which is also necessary to make the standard white. Such a mixing method is called a tristimulus value. An example is given below to demonstrate a conventional color mix method using this tristimulus value.

People react differently to colors. The same color can be perceived differently by different people. Therefore, colors are very important to a user who uses a monitor while working.

For example, when G and B are reduced from the value of a 9300° K (*Kelvin*) white, the R value becomes relatively large and reddish colors are displayed. The user can utilize different standard white value in the manner that he[/] *or* she stores different standard white values in memory and selects from them. For this, monitor manufacturers provide several limited colors, or values, which are most frequently utilized by the users. High quality monitors are designed so that the uses can adjust the colors, but inaccurate color values are utilized because they must select them depending on their own eyes.

The values supplied to users are abstract virtual color values, not the color values which appear actual color characteristics. When some software applications requiring more precise colors need a white value for the monitor, the users can only utilize the colors which are set during manufacture because they cannot know the white value of the monitor. Therefore, it is difficult for the users to adjust colors to particular values, and it takes much time. It is also a problem that the users cannot utilize a color adjustment function even though the monitor has this function.

SUMMARY OF THE INVENTION

Accordingly, the present invention is directed to a color curve control circuit and method that substantially obviates one or more of the limitations and disadvantages of the related art.

An object of the present invention is to improve a color function which enables users to adjust colors to the state they want in a monitor, by adjusting colors displayed on a monitor using the R, G, and B gain and cutoff signals which change according to the color curve in color space.

To achieve these and other advantages, and in accordance with the purpose of the present invention as embodied and broadly described, a color curve control circuit utilizes a data input unit, for entering values to adjust colors on the screen of a monitor, a microcomputer, for processing color signals corresponding to color temperature using stored color temperature data according to a color curve control program in order to change the colors on the screen according to signals generated by the data input unit, and for generating color gain signals and color cutoff signals, and a digital to analog converter for converting the digital color gain and cutoff signals from the microcomputer into analog signals.

It is to be understood that both the foregoing general description and the following detailed description are exemplary and explanatory and are intended to provide further explanation of the invention as claimed. Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention. In the drawings:

FIG. 1 is a circuit diagram of a color curve control circuit according to the principles of the present invention;

FIG. 2 is a graph showing a color curve corresponding to temperature; and

FIG. 3 is a flow chart for controlling the color curve according to the principles of the present invention.

DETAILED DESCRIPTION OF PREFERRED EMBODIMENT

Reference will now be made in detail to the preferred embodiments of the present invention, examples of which are illustrated in the accompanying drawings.

As shown in FIG. 1, a data input unit 10 includes a temperature sensing unit 11 for generating a temperature signal corresponding to the ambient temperature of the monitor, and a keypad 12 through which users select an automatic mode or manual mode of operation and input[s] color temperature values during the manual mode of operation. A microcomputer 20 receives the ambient temperature generated by temperature sensing unit 11 or the color temperature signals generated by keypad 12, converts the temperature signal into a digital signal, and processes data corresponding to the temperature signals using stored color temperature data and a color curve control program. A digital-to-analog converter (D/A converter) 30 receives digital R, G and B video gain and cutoff signals corresponding to the temperature signals from microcomputer 20, and converts the digital signals into analog signals. An on screen display (OSD) unit 40 processes OSD data which is serially transmitted from microcomputer 20, to display R, G and B OSD signals on the screen for the users. A video pre-amplifying unit 50 amplifies R, G and B video signals generated by a computer graphic adaptor (not shown) according to the levels of the R, G and B gain signals transmitted by D/A converter 30. A multiplexer 60 selects either the R, G and B video signals from video pre-amplifier 50 or the R, G and B OSD signals from OSD unit 40 in response to an enable signal OSD_EN. A video main-amplifying unit 70 amplifies the R, G and B video signal or the R, G and B OSD signals, transmitted by multiplexer 60, according to the R, G and B cutoff levels generated by D/A converter 30. A cathode-ray tube (CRT) 80 produces beams in response to the amplified R, G and B signals output by video main-amplifying unit 70, through R, G and B cathodes to display the signals.

The operation of the above circuit is now described. The ambient temperature of the monitor is sensed by the temperature sensor of temperature sensing unit 11 in data input unit 10. Since an ambient temperature signal generated by temperature sensing unit 11 is weak, it is amplified by an operational amplifier OP1 and then transmitted to microcomputer 20. *The operational amplifier OP1 is connected with the temperature sensing unit 11 to form an amplified temperature sensing signal unit 90.* Additionally, color temperature signals, selected by a user using keypad 12 of data input unit 10 during a manual mode, are input to microcomputer 20.

Microcomputer 20 generates color gain signals corresponding to the amplified ambient temperature or selected color temperature signals transmitted by temperature sensing unit 11 and keypad 12, respectively. The process by which microcomputer 20 generates the color gain signals is as follows.

The temperature signals generated by temperature sensing unit 11 are analog signals. When a user selects an automatic mode of operation using keypad 12, microcomputer 20 receives these analog temperature signals and converts them into digital signals. When a user selects a manual mode of operation using keypad 12, the user selects a color temperature using keypad 12, and keypad 12 generates a color temperature signal corresponding to the selected color temperature, and transmits it to microcomputer 20. Microcomputer 20 generates the R, G and B gain and cutoff signals, according to the selected operation mode, corresponding to the ambient temperature signal or color temperature signal using a color curve control program to read from stored color temperature data.

Microcomputer 20, which generates R, G and B gain and cutoff signals corresponding to the ambient temperature signal or color temperature signal, confirms information on colors to be illustrated on a screen as a result of processing the R, G and B gain and cutoff signals. Microcomputer 20 also generates OSD values, which includes information on the color temperature signal selected by the user or the ambient temperature sensed by temperature sensing unit 11, for transmission to OSD unit 40 to be displayed and viewed by the user. The R, G and B gain and cutoff signals generated by microcomputer 20 are transmitted to D/A converter 40 through a serial connection.

The R, G and B gain and cutoff signals generated by microcomputer 20 are digital signals. These digital R, G and B gain and cutoff signals are converted into analog signals by D/A converter 30, then transmitted to video pre-amplifying unit 50 and video main-amplifying unit 70, respectively.

OSD unit 40 receives the OSD data for displaying characters representing the sensed ambient temperature by temperature sensing unit 11 or the color temperature selected by a user through keypad 12. OSD unit 40 also receives horizontal (*H-SYNC*) and vertical sync (*V-SYNC*) signals transmitted through a computer graphic adaptor (not shown). The data which is input to OSD unit 40, is generated as signals R_OSD, G_OSD, B_OSD, and OSD_EN in synchronization with the horizontal and vertical sync signals from the graphic adaptor. The signals generated by OSD unit 40 are transmitted to multiplexer 60. This operation of displaying the information and color signals from microcomputer 20 on the screen of the monitor, is described below.

The R, G and B gain signals (R_Gain, G_Gain, B_Gain) generated by microcomputer 20 are converted into analog signals by D/A converter 30. The analog R, G and B gain signals (R_Gain, G_Gain, B_Gain) and R, G and B video signals from the computer graphic adaptor are transmitted to video pre-amplifying unit 50. [R] *Red* video (*R*) and [R] *red* gain (*R_Gain*) signals are supplied to operational amplifier OP2, [G] *green* video (*G*) and [G] *green* gain (*G_Gain*) signals are supplied to operational amplifier OP3, and [B] *blue* video (*B*) and [B] *blue* gain (*B*_Gain) signals are supplied to the operational amplifier OP4.

The R, G and B video signals, which are supplied to each operational amplifier of video pre-amplifying unit 50, are amplified to the levels of the [R] *red*, [G] *green* and [B] *blue* gain signals (*R_Gain, G_Gain, B_Gain*). The R, G and B video signals, amplified by video pre-amplifying unit 50, are transmitted to multiplexer 60. Multiplexer 60 receives signals OSD_R, OSD_G, OSD_B, and OSD_EN from OSD unit 40 with the pre-amplified R, G and B video signals. R video signal and signal OSD_R are supplied to operational amplifier OP5, G video signal and signal OSD_G are supplied to operational amplifier OP6, and B video signal and signal OSD_B are supplied to operational amplifier OP7.

The R, G and B video signals or the OSD signals, R_OSD, G_OSD, and B_OSD, of operational amplifiers OP5–OP7 are transmitted to video main-amplifying unit 70 in response to signal OSD_EN. At this time, only when multiplexer 60 is turned ON by OSD_EN, are the OSD signals, OSD_R OSD_G, and OSD_B, transmitted from the operational amplifiers of multiplexer 60 to video main-amplifying unit 70. The OSD_EN signal is generated only when the automatic or manual color correction modes are selected by the user using keypad 12, at all other times the R, G and B video signals output from the computer graphic adaptor is displayed according to the current [R] *red*, [G] *green* and [B] *blue* gain (*R_Gain, G_Gain, B_Gain*) and cutoff (*R_Cutoff, G_Cutoff, B_Cutoff*) signals applied to amplifiers 50 and 70, respectively.

Video main-amplifying unit 70 receives the R, G and B video or OSD signals selected according to the signal OSD_EN, and [R] *red*, [G] *green* and [B] *blue* cutoff signals (*R_Cutoff, G_Cutoff, B_Cutoff*) generated by D/A converter 30. R video or R_OSD, and R_Cutoff signals are supplied to operational amplifier OP8, G video or G_OSD, and G_Cutoff signals are supplied to operational amplifier OP9, and B video or B_OSD, and B_Cutoff signals are supplied to operational amplifier OP10 in video main-amplifying unit 70. The R, G and B video or OSD signals, which are transmitted to operational amplifiers OP8–OP10 of video main-amplifying unit 70, are amplified according to the levels of the color cutoff signals (R_Cutoff, G_Cutoff, B_Cutoff), transmitted by D/A converter 30. The amplified signals are sent to corresponding cathodes R, (R.K), G (G.K) and B (B.K) for display on the screen of the monitor through CRT (*Cathode-ray tube*) 80.

A general color theory about displaying colors the users want using ambient temperature signals or selected color temperature signals is described below with reference to the attached drawings.

FIG. 2 is a graph illustrating a color curve according to temperature. The arrows centered around the origin O represent R, G and B. The oval around the origin 0 represents the area of white. The curved line between points b and r represents color temperature in Kelvin, herein the temperature of point b is 9300° K, and the temperature of point r is 5000° K. The following is a detailed description of this graph.

A way of displaying colors in a monitor is explained through a color reduction method using R, G and B. It is widely known that maximum R, G and B create a white. The range of colors recognized by human beings as being white is wide. The Kelvin color temperature scale is utilized to standardize colors in this wide color range. As the color temperature increases, colors become close to blue (point b), whereas colors approach red (point r) as the temperature decreases. Therefore, color signals corresponding to temperature can be controlled by changing the R, G and B mix ratio.

A color adjustment method using a color curve is explained with reference to the attached drawings.

As shown in FIG. 3, a range of temperatures (T_len) is established according to T_MIN (*minimum temperature*) and T_MAX (*maximum temperature*) in factory mode during manufacture (step S91). When the range of temperatures, T_len, is established, [R] *red*, [G] *green* and [B] *blue* gain and cutoff values corresponding to the respective T_MIN and T_MAX are produced (step S92). The [R] *red*, [G] *green* and [B] *blue* gain and cutoff data corresponding to the range of temperature, T_len, is stored (step S93). A user selects a color correction mode as one of an automatic mode and a manual mode (step S94). The sensed ambient temperature is detected by microprocessor 20 to be compared to the stored values (step S95), when the automatic mode is selected in step S94. A color temperature value is entered by a user to be compared to the stored values (step S96) when the manual mode is selected in step S94. R*ed*, [G] *green* and [B] *blue* gain and cutoff values corresponding to the temperature range, T_len, are read (step S97) following steps S95 or S96.

The more detailed description of this procedure is set forth in the followings.

When establishing the temperature range, T_len, in the factory mode during manufacture, the temperature range is defined with minimum and maximum Kelvin temperatures. When the minimum and maximum temperatures are established in the factory mode, their coordinates are calculated (step S91). At step S92, [R] *red*, [G] *green* and [B] *blue* gain and cutoff values corresponding to the minimum and maximum temperatures, T_MIN and T_MAX, are calculated. For example, when the minimum temperature T_MIN is set at 5000° K, coordinates corresponding to 5000° K are calculated. When the maximum temperature T_MAX is set at 9300° K, coordinates corresponding to 9300° K are calculated. R*ed*, [G] *green* and [B] *blue* gain and cutoff values corresponding to the temperature range between minimum and maximum temperatures T_MIN and T_MAX, is generated using these coordinates. Additionally, a color curve value S, which effects the properties of the curve, is a value fixed during manufacture according to CRT (*Cathode-ray tube*) properties. When the calculated [R] *red*, [G] *green* and [B] *blue* gain and cutoff data corresponding to the temperature range between minimum and maximum temperatures, T_MIN and T_MAX, are stored at step S93, the operation in a factory mode is completed. When the calculated values are stored at step S93, a temperature is entered according to either a sensed ambient temperature or by the user at steps S95 and S96, respectively, as discussed above following selection of either an automatic or manual mode of color correction in step S94. Then, the [R] *red*, [G] *green* and [B] *blue* gain and cutoff values corresponding to the temperature range, T_len, are read (step S97) following steps S95 or S96.

Coordinates xc corresponding to the input temperature are calculated (step S98) from the following formula using the color curve value S:

$$xc=T-(x-T_len)\cdot(x+T_len)\times S$$

where[in], T is a predetermined temperature, x is a temperature which is substituted for medium temperature, T_len is a range of temperature, and S is the slope of the temperature curve.

When the coordinates of xc corresponding to the predetermined temperature are obtained, color temperature data Rx, Gx, and Bx, corresponding to the predetermined temperature are calculated. The data is obtained using the following formulas:

$$Rx=(Rmin\times(T_MAX-xc)+Rmax\times(xc-T_MIN))/(T_MAX-T_MIN)$$

$$Gx=(Gmin\times(T_MAX-xc)+Gmax\times(xc-T_MIN))/(T_MAX-T_MIN)$$

$$Bx=(Bmin\times(T_MAX-xc)+Bmax\times(xc-T_MIN))/(T_MAX-T_MIN)$$

where[in], the calculated color temperature data, Rx, Gx, and Bx, are digital signals. The color temperature data (Rx, Gx, and Bx) is converted onto [R] *red*, [G] *green* and [B] *blue* gain and cutoff data. That is, video signal gains and cutoff values (R_Gain, G_Gain, B_Gain R_Cutoff, G_Cutoff and B_Cutoff) are calculated from the values, T_MIN and T_MAX, according to the temperature which is input to microprocessor 20 in steps S95 or S96. The gain and cutoff values are obtained (step 99) using the following formulas:

$$R\text{-}Gain=(Rmin\times(T_MAX-xc)+Rmax\times(xc-T_MIN))/(T_MAX-T_MIN)$$

$$G\text{-}Gain=(Gmin\times(T_MAX-xc)+Gmax\times(xc-T_MIN))/(T_MAX-T_MIN)$$

$$B\text{-}Gain=(Bmin\times(T_MAX-xc)+Bmax\times(xc-T_MIN))/(T_MAX-T_MIN)$$

$$R_Cutoff=(Rmin\times(T_MAX-xc)+Rmax\times(xc-T_MIN)/(T_MAX-T_MIN)$$

$$G_cutoff=(Gmin\times(T_MAX-xc)+Gmax\times(xc-T_MIN)/(T_MAX-T_MIN)$$

$$B_Cutoff=(Bmin\times(T_MAX-xc)+Bmax\times(xc-T_MIN)/(T_MAX-T_MIN)$$

The digital gain and cutoff values are converted into analog signals at step S100.

In step S101 the user determines whether the color displayed on the screen is the desired color. When the displayed color data meets what the user wants, the steps for calculating the gain and cutoff values are completed at step S103. However, if the displayed color data is not what the user wants, the procedure returns (S102) to the step S94 where the manual correction mode is selected by the user. Thus, steps S96 to S101 are repeated until color meeting the user's demand is obtained.

Consequently, the present invention adjusts colors displayed on a monitor using [R] *red*, [G] *green* and [B] *blue* gain and cut-off signals which change according to a color curve in a color space in order to adjust colors as a user wants, thereby improving the color function which enables the user to easily adjust colors in the state he[/] *or* she wants.

It will be apparent to those skilled in the art that various modifications and variations can be made in the color curve control circuit and method of the present invention without deviating from the spirit or scope of the invention. Thus, it is intended that the present invention cover the modifications and variations of this invention provided they come within the scope of the appended claims and their equivalents.

What is claimed is:

1. A color curve control circuit comprising:

a data input unit, for entering values to change the colors on the screen of a video monitor;

a microcomputer, for processing color signals corresponding to color temperature using stored color temperature values and a color curve control program in order to change the colors on the screen according to signals received by the data input unit, and for generating digital color gain signals and digital color cutoff signals; and a digital to analog converter for converting the digital color gain signals and the digital cutoff signals from the microcomputer into analog gain signals and analog cutoff signals.

2. The circuit according to claim 1, further comprising:

an on screen display unit, for generating on screen display signals describing a procedure of transmitting the display values from the data input unit to the microcomputer, and changing the colors on the screen using said display values; and a multiplexer for selectively supplying the on screen display signals transmitted by the on screen display unit.

3. The circuit according to claim 1, wherein the data input unit comprises:

temperature sensing means, for automatically sensing ambient temperature of the monitor, and generating a temperature signal which automatically changes a color of the screen according to the temperature of the monitor; and a keypad through which a user enters temperature values indicating a desired color to manually change the color of the screen.

4. The circuit according to claim 1, further comprising:

a video pre-amplifier for generating amplified red, green and blue video signals by receiving red, green and blue video color signals from a computer and amplifying said red, green and blue video color signals in response to said analog gain signals;

an on screen display unit, for generating red, green and blue on-screen display signals describing a procedure of transmitting the display values from the data input unit to the microcomputer, and changing the colors on the screen using said display values;

a multiplexer for selectively supplying the amplified red, green and blue video signals and the red, green and blue on-screen display signals transmitted by the on screen display unit; and a video main-amplifier for amplifying, in response to said analog cutoff signals, one of the amplified red, green and blue video signals and the red, green and blue on-screen display signals selectively supplied by said multiplexer.

5. A color curve control circuit comprising:

a data input unit for entering temperature information;

a microcomputer for generating digital red, green and blue video gain signals and digital red, green and blue video cutoff signals by converting the temperature information into a digital signal, and processing color signals corresponding to the temperature information using stored color temperature data and a color curve control program;

a digital to analog converter for converting the digital red, green and blue video gain signals and the digital red, green and blue video cutoff signals from the microcomputer into analog red, green and blue video gain signals and analog red, green and blue video cutoff signals;

a first amplifier for generating amplified red, green and blue video signals by receiving red, green and blue video color signals from a computer and amplifying said red, green and blue video color signals in response to said analog red, green and blue video gain signals; and a second amplifier for generating amplified red, green and blue video display signals, for display on a color monitor, by receiving the amplified red, green and blue video signals generated by said first amplifier and amplifying said amplified red, green and blue video signals in response to said analog red, green and blue video cutoff signals.

6. The color curve control circuit as set forth in claim 5, further comprising:

an on screen display unit, for generating red, green and blue on-screen display signals describing a procedure for inputting said temperature information; and a multiplexer for selectively supplying the amplified red, green and blue video signals generated by said first amplifier and the red, green and blue on-screen display signals transmitted by the on screen display unit to said second amplifier.

7. The color curve control circuit as set forth in claim 5, wherein the data input unit comprises:

a keypad for selectively controlling said microprocessor to operate in one of an automatic mode and a manual mode, said temperature information being input by a user via said keypad during said manual mode; and a temperature sensor for inputting said temperature information by sensing an ambient temperature of the color monitor during said automatic mode.

8. The color curve control circuit as set forth in claim 7, further comprising:

an on screen display unit, for generating red, green and blue on-screen display signals describing a procedure for inputting said temperature information during said manual mode; and a multiplexer for selectively supplying the amplified red, green and blue video signals generated by said first amplifier and the red, green and blue on-screen display signals transmitted by the on screen display unit to said second amplifier.

*9. A method of color display adjustment, comprising:*

*selecting a range of temperatures according to maximum and minimum color temperature values;*

*entering a color temperature value within said selected range;*

*determining color gain and cut-off data according to said entered color temperature value, said maximum color temperature and said minimum color temperature: and*

*storing certain color gain and cut-off data of the determined gain and cut-off data.*

*10. The method of claim 9, further comprising of converting said color gain and cut-off values to analog signals.*

*11. The method of color display adjustment of claim 9, further comprising of determining initial color gain and cut-off values corresponding to the color temperature range between maximum and minimum color temperature values before said entering the color temperature value.*

*12. A method of color display adjustment, comprising:*

*selecting a range of temperatures according to maximum and minimum color temperature values;*

*inputting a user selected color temperature value within said selected range;*

*determining color gain and cut-off data according to said user selected value, said maximum color temperature and said minimum color temperature; and*

*storing color gain and cut-off data corresponding to the selected range.*

*13. A method of color display adjustment, comprising:*

*receiving a color temperature value;*

*establishing a range of color temperatures, with the range of color temperatures being determined through both maximum and minimum color temperatures and being between maximum and minimum color temperatures;*

*calculating gain and cutoff values according to said range and received color temperature value; and*

*storing gain and cutoff values of said range.*

*14. The method of claim 13, further comprising of converting said color gain and cut-off values to analog signals.*

*15. A method of color display adjustment, comprising:*

*setting a range of color temperature values;*

*determining color gain and cutoff data corresponding to minimum and maximum color temperature values in said range of color temperature values;*

*storing said color gain and cutoff data;*

*entering a color temperature value by a user;*

*reading said color gain and cut-off values corresponding to said range; and*

*calculating color gain and cut-off values according to said entered color temperature value.*

*16. A method of obtaining color temperature data for a color curve control circuit, comprising:*

*providing a range of temperatures between a maximum and a minimum temperature;*

*providing a gain and cutoff data according to said minimum temperature;*

*providing a slope of a temperature curve; and*

*calculating color temperature data corresponding to a selected temperature according to said slope of said temperature curve.*

*17. The method of claim 16, with the slope of said temperature curve being a predetermined value set during manufacture according to properties of a video display.*

*18. The method of claim 16, with said color temperature data being red temperature data, green temperature data, and blue temperature data.*

*19. The method of claim 16, with said gain being a red gain, a green gain and a blue gain.*

*20. The method of claim 16, with said cutoff being a red cutoff, a green cutoff, and a blue cutoff.*

*21. The method of claim 16, further comprising of converting said color temperature data into an analog signal.*

*22. The method of claim 16, further comprising formulas for calculating said color temperature data being:*

$$R_x=(R_{min}\times(T_MAX-xc)+R_{max}\times(xc-T_MIN))/(T_MAX-T_MIN);$$

$$G_x=(G_{min}\times(T_MAX-xc)+G_{max}\times(xc-T_MIN))/(T_MAX-T_MIN);$$

*and*

$$B_x=(B_{min}\times(T_MAX-xc)+B_{max}\times(xc-T_MIN))/(T_MAX-T_MIN);$$

*wherein $R_x$, $G_x$, $B_x$ corresponds to the color temperature of a red, green, and blue color signals respectively, $R_{min}$, $G_{min}$, $B_{min}$ corresponding to a minimum value of the color temperature of the red, green, and blue color signals respectively, $R_{max}$, $G_{max}$, $B_{max}$ corresponding to a maximum value of the color temperature of the red, green, and blue color signals respectively, T_MAX corresponding to the maximum temperature in the range of temperature, and T_MIN corresponding to the minimum temperature in the range of temperature.*

*23. A method of adjusting color on a monitor, comprising:*

*providing a slope of a temperature curve representing the gain of each color at a selected temperature;*

*providing both a temperature sensor detecting a temperature and a manual switch manually selecting a temperature;*

*inputting a temperature in accordance with one of the temperature sensor and said manual switch; and*

*calculating said gain of each color in response to said temperature.*

*24. A method, comprising:*

*entering values to change the colors on the screen of a video monitor;*

*processing color signals corresponding to color temperature using stored color temperature values and a color curve control program in order to change the colors on the screen according to signals received by the entering values, and generating digital color gain signals and digital color cutoff signals; and*

*converting the digital color gain signals and the digital cutoff signals from the processing color signals into analog gain signals and analog cutoff signals.*

*25. The method of claim 24, further comprising:*

*generating on-screen display signals describing a procedure of transmitting the display values from entering values to processing the values, and changing the colors on the screen using said display values; and*

*supplying selectively the on-screen display signals for display.*

*26. The method of claim 24, with the entering values further comprising:*

*automatically sensing ambient temperature of the video monitor, and generating a temperature signal automatically changing a color of the screen according to the temperature of the video monitor; and*

*entering manually temperature values indicating a desired color to change the color of the screen.*

*27. The method of claim 24, further comprising:*

*generating amplified red, green and blue video color signals by receiving red, green and blue video color signals from a computer and amplifying said red, green and blue video color signals in response to said analog gain signals;*

*generating red, green and blue on-screen display signals describing a procedure of transmitting the display values from the entering the values to the processing the color signals, and changing the colors on the screen using said display values;*

*supplying selectively the amplified red, green and blue video signals and the red, green and blue on-screen display signals transmitted by the generating red, green and blue on-screen display signals; and*

*amplifying, in response to said analog cutoff signals, one of the amplified red, green and blue video signals and the red, green and blue on-screen display signals selectively supplied.*

*28. A method, comprising:*

*entering temperature information;*

*generating digital red, green and blue video gain signals and digital red, green and blue video cutoff signals by converting the temperature information into a digital signal, and processing color signals corresponding to the temperature information using stored color temperature data and a color curve control program;*

*converting the digital red, green and blue video gain signals and the digital red, green and blue video cutoff signals from a microcomputer into analog red, green and blue video gain signals and analog red, green and blue video cutoff signals;*

*generating amplified red, green and blue video signals by receiving red, green and blue video color signals from a computer and amplifying said red, green and blue video color signals in response to said analog red, green and blue video gain signals; and*

*generating amplified red, green and blue video display signals, for display on a color monitor, by receiving the amplified red, green and blue video signals generated by the generating amplified red, green and blue video signals and amplifying the amplified red, green and blue video signals in response to said analog red, green and blue video cutoff signals.*

*29. The method of claim 28, further comprising:*

*generating red, green and blue on-screen display signals describing a procedure for inputting said temperature information; and*

*supplying selectively the amplified red, green and blue video signals generated by said generating amplified red, green and blue video signals and the red, green and blue on-screen display signals transmitted to said generating amplified red, green and blue video display signals.*

*30. The method of claim 28, with the entering temperature information further comprising of selecting a manual mode for manually inputting the temperature information.*

*31. The method of claim 30, further comprising:*

*generating red, green and blue on-screen display signals describing a procedure for inputting said temperature information during said manual mode; and*

*selectively supplying the amplified red, green and blue video signals generated by said generating amplified red, green and blue video signals by receiving red, green and blue video color signals from a computer and the red, green and blue on-screen display signals transmitted by the generating red, green and blue on-screen display signals to said generating amplified red, green, and blue video display signals, for display on a color monitor.*

*32. A method, comprising:*

*setting a temperature range within a predetermined range;*

*determining the gains and cutoff values of a plurality of color data signals, each one of the color data signals being a distinct spectral component, said plurality of color data signals forming a color video image when combined, the plurality of color data signals including a first color data signal, a second data signal, and a third data signal corresponding to a minimum temperature value and maximum temperature value in said set temperature range;*

*storing the determined gains and cutoff values of the plurality of color data signals;*

*entering a color temperature within said set temperature range; and*

*reading gains and cutoff values of the first, second, and third color data signal corresponding to said set temperature range.*

*33. A method, comprising:*

*setting a temperature range;*

*determining the gains and cutoff values of a plurality of color data signals, each one of the color data signals being a distinct spectral component, said plurality of color data signals forming a color video image when combined, the plurality of color data signals including a first color data signal, a second data signal, and a third data signal corresponding to a minimum temperature value and maximum temperature value in said set temperature range;*

*entering a temperature; and*

*reading gains and cutoff values of the first, second, and third color data signal corresponding to said temperature range,*

*further comprising of determining xc corresponding to the input temperature from the following formula with color curve slope of value S:*

$$xc=T-(x-T_len)\times(x+T_len)\times S;$$

*with T corresponding to a predetermined temperature, x corresponding to a temperature substituted for a medium temperature, T_len corresponding to the*

*range of temperatures, and S corresponding to the slope of the temperature curve.*

*34. The method of claim 33, further comprising of determining color temperature data for each one of the first, second, and third color data signals according to the following formula:*

$$A_x=(A_{min}\times(T_MAX-xc)+A_{max}\times(xc-T_MIN))/(T_MAX-T_MIN);$$

*wherein $A_x$ corresponds to the color temperature of one of the color data signals, $A_{min}$ corresponds to a minimum value of the color temperature of one of the color data signals, $A_{max}$ corresponding the a maximum value of the color temperature of one of the color data signals, T_MAX corresponding to the maximum temperature in the range of temperature, T_MIN corresponding to the minimum temperature in the range of temperature.*

*35. The method of claim 34, further comprising of determining gain and cutoff values of each one of the video components according to $A_x$ with respect to the inputted temperature.*

*36. The method of claim 35, further comprising of converting the gain and cutoff values from digital to analog.*

*37. The method of claim 36, further comprising of determining whether the color displayed on the screen is the desired color according to the gain and cutoff values.*

*38. The method of claim 37, with the first color data signal being a red video signal, the second color data signal being a blue video signal, and the third color data signal being a green video signal.*

*39. A color curve control circuit, comprising:*

*a data input unit selectively entering values to change the colors on the screen of a video monitor; and*

*a microcomputer processing color signals corresponding to color temperatures including a color curve control program generating digital color gain signals and digital color cutoff signals using a selected range of color temperatures according to signals received by said data input unit.*

*40. The color curve control circuit of claim 39, further comprising a digital to analog converter for converting the digital color gain signals and the digital cutoff signals from the microcomputer into analog gain signals and analog cutoff signals.*

*41. The circuit according to claim 39, further comprising an on-screen display unit, for generating on-screen display signals describing a procedure of transmitting the display values from the data input unit to the microcomputer, and changing the colors on the screen using said display values.*

*42. The circuit according to claim 41, further comprising a multiplexer for selectively supplying the on-screen display signals transmitted by the on-screen display unit.*

*43. The circuit according to claim 39, further comprising an on-screen display unit generating red, green, and blue on-screen display signals to display on the screen from data transmitted from the microcomputer.*

*44. The circuit according to claim 43, further comprising a multiplexer selecting either the red, green, and blue video signals from a video pre-amplifier or the red, green and blue on-screen display signals from the on-screen display unit in response to an enable signal from the on-screen display unit.*

*45. The circuit according to claim 39, with the microcomputer generating on-screen display values for an on-screen display unit, the on-screen display values including information on the color temperature signal selected by a user for transmission to the on-screen display unit to be displayed and viewed by the user.*

*46. The circuit according to claim 39, further comprising an on-screen display unit displaying the color temperature selected by a user through said data input unit, the on-screen display unit receiving horizontal and vertical sync signals, from the data inputted from the microprocessor to the on-screen display unit, the on-screen display unit outputting on-screen display signals for each of the color signals, and an on-screen display enable signal in synchronization with the horizontal and vertical sync signal.*

*47. The circuit according to claim 46, with the on-screen display enable signal being generated only when a color correction mode is selected by a user using a data input unit.*

*48. The circuit according to claim 46, with the color signals being displayed according to a current gain and cutoff signals when there is no on-screen display enable signal.*

*49. The circuit according to claim 39, further comprising a plurality of first amplifier units for each color component of the color signals, the color signals being amplified to the levels of the gain signals in each color component of the color signals from the digital to analog converter.*

*50. An apparatus, comprising:*

*a data input unit selectively entering values manually or automatically to change the colors on the screen of a video monitor;*

*a microcomputer processing a plurality of color data signals by using color temperature data corresponding to the plurality of color data signals, the color temperature data computed by said microcomputer according to a selected range of color temperatures and the signals received from the data input unit; and*

*a digital to analog converter for converting digital color gain signals and digital cutoff signals from the microcomputer into analog gain signals and analog cutoff signals.*

*51. The apparatus of claim 50, further comprising:*

*a first amplifier for amplifying the plurality of color data signals according to the respective gain signals for each on the color data signals;*

*an on-screen display unit generating an on-screen display signal for each of the plurality of color data signals and an on-screen display enable signal;*

*a multiplexer selectively supplying the amplified color data signals from the first amplifier and the plurality of on-screen display signals from the on-screen display unit; and*

*a second amplifier for amplifying the plurality of color data signals amplified by the first amplifier or the plurality of on-screen display signals, transmitted by the multiplexer, according to the cut off levels for each of the plurality of color data signals generated by the digital to analog converter.*

*52. The apparatus of claim 50, further comprising an on-screen display unit generating an on-screen display signal for each one of the plurality of color data signals and an on-screen display enable signal.*

*53. The apparatus of claim 51, with the on-screen display signals for each one of the plurality of color data signals being transmitted to the second amplifier in response to the on-screen display enable signal.*

*54. The apparatus of claim 50, further comprising an on-screen display unit generating an on-screen display signal including information on the color temperature signal selected by the user.*

*55. The apparatus of claim 51, with the multiplexer being turned on by the on-screen display enable signal to transmit the on-screen display signals from amplifiers of the multiplexer to the second amplifying unit.*

*56. The apparatus of claim 55, with the on-screen display enable signal being generated when the data input unit selectively enters values to change the colors on the screen of the video monitor.*

*57. The apparatus of claim 51, with the multiplexer further comprising a plurality of operational amplifiers, each one of the plurality of operational amplifiers corresponding to an on-screen display signal for a corresponding one of the color data signals.*

*58. The apparatus of claim 51, with the second amplifier amplifying the plurality of color data signals or the on-screen display signals according to the levels of the color cutoff signals for each of the color data signals transmitted by the digital to analog converter.*

*59. The apparatus of claim 50, with the microcomputer including a color curve program adjusting the color using a color curve with the range of temperatures established according to a preset maximum temperature and minimum temperature.*

*60. The apparatus of claim 50, with the microcomputer computing the color temperature data by using a maximum and minimum temperatures of the selected range of color temperatures.*

*61. A method of displaying color adjustment in a display monitor stored in a microcomputer, comprising:*

*receiving a user selected color temperature value;*

*determining a color temperature data according to a user selected color temperature value, a corresponding color curve and a predetermined range of color temperature values; and*

*determining color gain and cut-off values corresponding to said user selected color temperature value according to said color temperature data.*

*62. The method of claim 61, further comprising of converting said color gain and cut-off values to analog signals.*

*63. An apparatus, comprising a microcomputer including a memory for storing instructions for displaying and adjusting color in a display monitor with an associated color curve, a predetermined range of color temperatures with a maximum value and minimum value, the instructions comprising of receiving a user selected color temperature value, determining a color temperature data based on said user selected color temperature value, said associated color curve and said predetermined range, determining color gain and cut-off values corresponding to said user selected color temperature value based on said color temperature data.*

*64. An apparatus, comprising a microcomputer storing instructions for displaying and adjusting color in a display monitor with an associated color curve, a predetermined range of color temperatures with a maximum value and minimum value, the instructions comprising of receiving a user selected color temperature value, determining a color temperature data based on said user selected color temperature value, said associated color curve and said predetermined range, determining color gain and cut-off values corresponding to said user selected color temperature value based on said color temperature data.*

*65. An apparatus, comprising of a unit storing instructions for displaying and adjusting color in a display monitor with an associated color curve, a predetermined range of color temperatures with a maximum value and minimum value, the instructions comprising of receiving a user selected color temperature value, determining a color temperature data based on said user selected color temperature value, said associated color curve and said predetermined range, determining color gain and cut-off values corresponding to said user selected color temperature value based on said color temperature data.*

*66. A method of displaying color adjustment in a display monitor having an associated color curve and a predetermined range of color temperatures with a maximum value and a minimum value provided by a stored program, said method comprising:*

*receiving a user selected color temperature value;*

*determining a color temperature data based on said user selected color temperature value, said associated color curve and said predetermined range;*

*determining color gain and cut-off values corresponding to said user selected color temperature based on said color temperature data; and*

*converting said color gain and cutoff values to analog signals.*

*67. A method, comprising:*

*receiving a user selected color temperature value;*

*determining a color temperature data based on said user selected color temperature value, a associated color curve and a predetermined range;*

*determining color gain and cut-off values corresponding to said user selected color temperature value based on said color temperature data; and*

*converting said color gain and cutoff values to analog signals.*

*68. The method of claim 67, with said steps being implemented by a stored program.*

*69. The method of claim 68, with said program being stored in a memory.*

*70. The method of claim 68, with said program being stored in a memory of a microcomputer.*

*71. The method of claim 68, with said program being stored in a storage medium comprised from a microcomputer.*

*72. A color curve circuit, comprising:*

*a data input unit, for entering values to change colors appearing on a screen of a video monitor;*

*a microcomputer, for processing color signals corresponding to color temperatures by using stored color temperature values and a color curve control program in order to change said colors appearing on the screen according to signals received by the data input unit, and for generating color gain signals and color cutoff signals.*

*73. A method of color display adjustment of the color curve control unit of claim 1, comprising:*

*selecting a range of temperatures according to maximum and minimum color temperature values;*

*inputting a user selected value; and*

*determining color gain and cut-off data according to said user selected value, said maximum color temperature and said minimum color temperature.*

*74. A method of obtaining color temperature data for a color curve control circuit of claim 1, comprising:*

*providing a range of temperatures between a maximum and a minimum temperature;*

*providing a gain and cutoff data according to said minimum temperature;*

*providing a slope of a temperature curve; and*

*calculating color temperature data corresponding to a selected temperature according to said slope of said temperature curve.*

*75. A method of the color curve control circuit of claim 1, comprising:*

*entering values to change the colors on the screen of a video monitor;*

*processing color signals corresponding to color temperature using stored color temperature values and a color curve control program in order to change the colors on the screen according to signals received by the entering values, and generating digital color gain signals and digital color cutoff signals; and*

*converting the digital color gain signals and the digital cutoff signals from the processing color signals into analog gain signals and analog cutoff signals.*

*76. A method of the color curve control circuit of claim 5, comprising:*

*entering temperature information;*

*generating digital red, green and blue video gain signals and digital red, green and blue video cutoff signals by converting the temperature information into a digital signal, and processing color signals corresponding to the temperature information using stored color temperature data and a color curve control program;*

*converting the digital red, green and blue video gain signals and the digital red, green and blue video cutoff signals from a microcomputer into analog red, green and blue video gain signals and analog red, green and blue video cutoff signals;*

*generating amplified red, green and blue video signals by receiving red, green and blue video color signals from a computer and amplifying said red, green and blue video color signals in response to said analog red, green and blue video gain signals; and*

*generating amplified red, green and blue video display signals, for display on a color monitor, by receiving the amplified red, green and blue video signals generated by the generating amplified red, green and blue video signals and amplifying the amplified red, green and blue video signals in response to said analog red, green and blue video cutoff signals.*

*77. A method of the color curve control circuit of claim 1, comprising:*

*setting a temperature range;*

*determining the gains and cutoff values of a plurality of color data signals, each one of the color data signals being a distinct spectral component, said plurality of color data signals forming a color video image when combined, the plurality of color data signals including a first color data signal, a second data signal, and a third data signal corresponding to a minimum temperature value and maximum temperature value in said set temperature range;*

*entering a temperature; and*

*reading gains and cutoff values of the first, second, and third color data signal corresponding to said temperature range.*

*78. The color curve control circuit of claim 1, comprising:*

*said data input unit selectively entering values to change the colors on the screen of said video monitor; and*

*said microcomputer processing color signals corresponding to color temperatures including a color curve control program generating digital color gain signals and digital color cutoff signals using a selected range of color temperatures according to signals received by said data input unit.*

* * * * *